US012746892B2

(12) United States Patent
Brudniok

(10) Patent No.: US 12,746,892 B2
(45) Date of Patent: Sep. 29, 2026

(54) VEHICLE TREATMENT SYSTEM WITH TACTILE COLLISION DETECTION DEVICE

(71) Applicant: Wash Tec Holding GmbH, Augsburg (DE)

(72) Inventor: Sven Brudniok, Langerringen (DE)

(73) Assignee: Washtec Holding GmbH, Augsburg (DE)

( * ) Notice: Subject to any disclaimer, the term of this patent is extended or adjusted under 35 U.S.C. 154(b) by 72 days.

(21) Appl. No.: 18/835,498

(22) PCT Filed: Feb. 2, 2023

(86) PCT No.: PCT/EP2023/052505
§ 371 (c)(1),
(2) Date: Aug. 2, 2024

(87) PCT Pub. No.: WO2023/148247
PCT Pub. Date: Aug. 10, 2023

(65) Prior Publication Data

US 2025/0136064 A1 May 1, 2025

(30) Foreign Application Priority Data

Feb. 3, 2022 (DE) ..................... 10 2022 102 613.2

(51) Int. Cl.
*B60S 3/06* (2006.01)

(52) U.S. Cl.
CPC ....................................... *B60S 3/06* (2013.01)

(58) Field of Classification Search
None
See application file for complete search history.

(56) References Cited

U.S. PATENT DOCUMENTS

2021/0261098 A1 8/2021 Kircheis et al.

FOREIGN PATENT DOCUMENTS

CN 106985794 A 7/2017
DE 4417864 A1 11/1995
(Continued)

OTHER PUBLICATIONS

Kim et al., "KR20200018102A English Machine Translation.pdf", Feb. 19, 2020—Machine translation from Espacenet.com.*
(Continued)

*Primary Examiner* — Levon J Shahinian
(74) *Attorney, Agent, or Firm* — Christopher A. Rothe; CM Law

(57) ABSTRACT

A vehicle treatment system includes a treatment device. A vehicle to be treated is moveable relative to the treatment device in a movement direction within a treatment region. A tactile collision detection device has a collision body supported on the treatment device via a connection component. The collision body is located on an outer border of the treatment region in a starting position. A sensor unit can detect a movement of the collision body relative to the treatment device as a collision risk between the treatment device and the vehicle. The collision body is supported on the treatment device via the connection component such that during a collision with the vehicle, the collision body is moved in a direction opposite to and/or a direction perpendicular to the movement direction of the treatment device until the treatment device completely stops after a collision risk has been detected.

15 Claims, 7 Drawing Sheets

(56) References Cited

FOREIGN PATENT DOCUMENTS

| | | | |
|---|---|---|---|
| DE | 202005019418 | U1 | 5/2007 |
| DE | 102007010730 | A1 | 9/2007 |
| DE | 102018117440 | A1 | 1/2020 |
| JP | H08058535 | A | 3/1996 |
| JP | 10059140 | A | 3/1998 |
| KR | 100799191 | B1 | 1/2008 |
| KR | 102128998 | B1 | 7/2020 |

OTHER PUBLICATIONS

Search Report received in German Application No. 10 2022 102 613.2 dated Oct. 25, 2022, with translation, 13 pages.
Search Report received in International Application No. PCT/EP2023/052505 dated Apr. 12, 2023, with translation, 6 pages.
Written Opinion received in International Application No. PCT/EP2023/052505 dated Apr. 12, 2023, with translation, 8 pages.
Office Action received in European Application No. 23 703 412.9 dated Mar. 26, 2026, with translation, 11 pages.

* cited by examiner

VEHICLE TREATMENT SYSTEM WITH TACTILE COLLISION DETECTION DEVICE

CROSS-REFERENCE TO RELATED APPLICATIONS

This application is the United States national stage entry of International Application No. PCT/EP2023/052505, filed on Feb. 2, 2023, and claims priority to German Application No. 10 2022 102 613.2, filed on Feb. 3, 2022. The contents of International Application No. PCT/EP2023/0525 and German Application No. 10 2022 102 613.2 are incorporated by reference herein in their entireties.

FIELD

The disclosure relates to a vehicle treatment system in which at least one treatment device, in particular a wash gantry, and a vehicle to be treated are movable relative to each other within a treatment region, comprising a tactile collision detection device having a collision body supported via at least one connection component on the treatment device and located in a starting position (zero position) at an outer border of the treatment region of the treatment device, and a sensor unit configured to detect a movement of the collision body relative to the treatment device as a collision risk between the treatment device and the vehicle.

BACKGROUND

It is a known problem in the field of vehicle treatment systems, when there is relative movement between a vehicle to be treated and a vehicle treatment device, that if the vehicle is positioned incorrectly, it might be damaged by a collision with the vehicle treatment device. Vehicle treatment systems, in particular gantry washing systems, which are operated without instruction personnel, therefore generally have a device for monitoring the borders of the maximum treatment space. This device is intended to prevent a possible collision between the vehicle treatment system and the vehicle to be treated. Width monitoring is a device for monitoring the lateral borders of the vehicle treatment system or of the maximum passage width. If a vehicle is incorrectly positioned when it enters the vehicle treatment system, thus causing regions of the vehicle to exceed the borders of the maximum passage width partially or completely, there is a risk of collision with the vehicle treatment system or parts of it (in the case of a gantry washing system, for example, with the gantry columns).

Collision detection devices for vehicle treatment systems are known from the state of the art which use tactile systems or mechanical deflection systems, such as switching or contact strips, pull-wire switches, bending rods or the like, in order to prevent damage like this. What all these systems have in common is that when there is contact between the corresponding tactile switching element and the vehicle, a circuit is executed which forces the relative movement to stop. For example, DE 10 2007 010 730 A 1 shows a vehicle treatment system with a washing brush arranged transversely to the movement direction of the system. In this case, the washing brush is arranged on a swivel-mounted brush holder hinged to the system. In order to avoid a collision of the brush holder with an outer contour of the vehicle, a curved safety bracket is provided on the brush holder, which causes the system to be switched off immediately in the event of mechanical contact with the outer surface.

Furthermore, the use of various non-contact sensors (mainly in the form of light barriers) for collision monitoring is known from the state of the art. For example, DE 44 17 864 A1 discloses a vehicle treatment system in which a treatment unit of the vehicle treatment system is moved along a side surface of a vehicle via a scanning device with at least one sensor designed as a light barrier. Furthermore, DE 10 2018 117 440 A1 discloses a vehicle treatment system with a collision detection device, in which optical sensors, in particular laser distance sensors, are provided for monitoring a lateral border of a treatment region of the vehicle treatment system. A further example of non-contact sensors is shown in DE 20 2005 019 418 U1. Here, the vehicle treatment system has a scanning device for three-dimensional scanning and detection of a vehicle surface.

However, in the region of a vehicle treatment system, optical measurement methods always have the disadvantage that they are incorrectly triggered as a result of interference such as spray mist, water jets or other media. This means that optical measurement methods have disadvantages that make reliable operation in the measurement task difficult or impossible.

SUMMARY

The objects and objectives of the disclosure are to eliminate or at least reduce the disadvantages of the prior art and in particular to provide a tactile vehicle treatment system which effectively and safely avoids a collision of the treatment device with the vehicle to be treated in all operating and/or movement states of the treatment device. Accordingly, such a vehicle treatment system is intended to include a width monitoring which recognizes when the lower/near-ground region of a body of the vehicle to be treated is placed with lateral offset (in width direction) to or obliquely in front of the treatment device, when the vehicle to be treated is placed too far to the side (in width direction), and when a door of the vehicle to be treated is opened in front of the treatment device or when the vehicle is placed transversely to the movement direction of the treatment device.

The objects and objectives are solved with regard to a generic vehicle treatment system according to the disclosure.

According to the disclosure, the vehicle treatment system is configured/adapted such that the collision body is supported on the treatment device via the at least one connection component such that, in the event of a collision with the vehicle, the collision body is displaced in a direction opposite to and/or in a direction perpendicular to the movement direction of the treatment device until the treatment device stops completely after a collision risk has been detected by the sensor unit.

In other words, the collision body is coupled to the treatment device via the at least one connection component in such a way that, in the event of a collision with a vehicle, it can move opposite to and/or perpendicular to the movement direction of the treatment device until the treatment device comes to a complete standstill after the collision risk has been detected. That is, the collision body has such a large range of movement, both opposite to and perpendicular to the movement direction of the treatment device, that it is ensured that the treatment device stops/halts before the collision body strikes components of the treatment device and is thus hindered in its movement. If the collision body is restricted in its movement before the treatment device has stopped, the treatment device could press the collision body against the vehicle and damage it.

In yet other words, the collision body is supported on the treatment device via the at least one connection component such that, in the event of a collision with the vehicle, the collision body displaces/retreats in a direction opposite and/or in a direction perpendicular to the movement direction of the treatment device, wherein a maximum displacement path/travel path which the collision body can describe in the event of a collision with the vehicle due to the kinematics of its suspension is greater than a braking path/following path which the treatment device requires in order to stop after a collision risk has been detected by the sensor unit.

The embodiment according to the disclosure can therefore ensure that the treatment device can be stopped in good time after a collision risk has been detected, regardless of the orientation of the vehicle relative to the vehicle treatment system. This in turn can prevent damage to the vehicle.

The vehicle treatment system is further configured/adapted such that the collision body together with the at least one connection component are movable relative to the treatment device and a collision risk between the treatment device and the vehicle is detected when the collision body and the at least one connection component are moved, in particular in a direction opposite and/or in a direction perpendicular/cross to the movement direction of the treatment device.

In other words, according to the disclosure, the vehicle treatment system is configured such that the collision body and the connection component (at least partially) move away from the treatment region, in particular in a direction opposite and in a direction perpendicular to the movement direction of the treatment device, when a collision risk between the treatment device and the vehicle is detected or when a collision between the collision body and the vehicle is detected, respectively.

In yet other words, the vehicle treatment system according to the disclosure is designed such that the connection component enables stable positioning of the collision body in its starting position in collision-free operation, i.e. when no collision risk is detected. If a collision risk is detected, the collision body together with the connection component can be pushed away from the vehicle in at least one movement direction with low required force.

This ensures reliable and early detection of a collision, even in the event of external interference such as spray mist, water jets, etc. Since the collision body can be moved away from the treatment region with little force, damage to the vehicle, such as damage to the paintwork, can be reduced or avoided.

Advantageous embodiments are explained below.

According to a preferred embodiment, the vehicle treatment system may also have at least one sensor which is configured to detect movement of the collision body and/or of the at least one connection component relative to each other or relative to the treatment device. The sensor may thus be configured to detect a collision risk between the treatment device and the vehicle. The at least one sensor may be provided at an interface (connection portion) between the connection component and the treatment device, in particular a frame of the treatment device. Alternatively or additionally, at least one further sensor may be provided at an interface between the connection component and the collision body. It may also be expedient if, alternatively or additionally, a further sensor is provided in the connection component itself.

The at least one sensor may preferably be configured to detect a relative movement between the treatment device and the collision body together with the at least one connection component. That is, the sensor may be configured to detect a longitudinal displacement and/or a twisting movement between the treatment device and the collision body or the at least one connection component. In other words, the collision between the collision body and the vehicle can be detected by recognizing a change in position/orientation between a composite of the collision body and the at least one connection component and the treatment device with a suitable sensor, for example a laser sensor.

It is also conceivable that the at least one sensor may detect a force on the collision body occurring during the collision between the collision body and the vehicle. In this case, the at least one sensor may be arranged, for example, at an interface between the connection component and the collision body or at an interface between the treatment device and the connection component or in the connection component, so that the force that is transmitted via the respective interface can be detected by the sensor. Suitable sensors, such as piezoelectric sensors or strain gages, are conceivable for this purpose.

Furthermore, it may be expedient for the sensor, in particular together with the connection component, to move out of the treatment region when a collision risk between the treatment device and the vehicle is detected.

In an advantageous further development, a distance by which the collision detection device is positioned upstream of the treatment device may be greater than or equal to the braking path/following path which the treatment device requires in order to stop after a collision has been detected by the collision detection device. In other words, the collision detection device, in particular the collision body, are spaced apart from the treatment device in such a way that after a collision risk has been detected or after a collision of the vehicle with the collision body, it can be ensured that the treatment device is stopped before a collision with the vehicle. The following path can be considered as a sum of a product of a speed of the treatment device and a reaction time as well as a distance which is covered due to a mass inertia of the treatment device before the treatment device comes to a stop. The speed of the treatment device is the speed at which the treatment device moves relative to the vehicle. The reaction time of the vehicle treatment system corresponds to the time it takes for the vehicle treatment system to effect stopping after detecting a collision between the collision body and the vehicle.

In a preferred embodiment, it may be expedient if the collision body, which may be suspended at two points, is formed as a dimensionally stable/stiff/rigid collision body. This means that when the collision body collides with the vehicle, the collision body does not deform or deforms only insignificantly, but merely shifts in the direction opposite and/or in the direction perpendicular to the movement direction of the treatment device, which can be detected by the sensor. In other words, the collision detection device has a dimensionally stable collision body that does not undergo significant elastic or plastic deformation in the event of a collision with the vehicle, but is merely displaced by the vehicle. The use of a dimensionally stable collision body significantly increases the sensitivity when detecting a collision risk compared to elastically deformable collision bodies. In particular, if the treatment device collides with components of a vehicle to be treated that are further away from the sensor that detects the displacement of the collision body, as is the case with a vehicle side mirror, for example, it may happen that deformable collision bodies that are (elastically or plastically) deformed to detect a collision risk may merely deform due to their low dimensional stability and evade the vehicle component without the collision risk being detected by the sensor. In addition, the use of a dimensionally stable collision body, i.e. the use of a collision body that only has a very small deformation path when the sensor detects the collision, makes it possible to reduce the necessary following path that the vehicle treatment system has to provide until the treatment device comes to a stop after a collision with the collision body.

Furthermore, it may be advantageous if the connection component is designed as a dimensionally stable/stiff/rigid connection component which, in the event of a collision of the collision body with the vehicle, enables the collision body to be displaced without deforming (elastically or plastically), i.e. without changing its external shape. The use of such a dimensionally stable connection component to support the collision body on the treatment device ensures better/more precise stationary positioning of the collision body in front of the treatment device and enables a reduction in the susceptibility to vibration of the collision body and its suspension during operation of the vehicle treatment system.

According to a configuration example according to the disclosure, the collision body may have a plurality of segments spaced apart from each other, in particular in a height direction of the vehicle treatment system, in order to collide with corresponding vehicle components in accordance with the geometry of the vehicle. In other words, the collision body may be designed in several parts, whereby the individual segments can be designed and aligned with each other in such a way that they may each collide with certain components of the vehicle.

In a particularly advantageous implementation, the collision body may have two segments spaced apart from each other, in particular in the height direction of the vehicle treatment system, in order to collide with a first collision-body segment with a first vehicle component and with a second collision-body segment with a second vehicle component. It may be expedient for the first and second collision-body segments to be rigidly connected to each other. Advantageously, the collision body may be designed as a collision rod with a long rod segment as the first collision-body segment and a short rod segment as the second collision-body segment. The long rod segment and the short rod segment may preferably be spaced axially parallel to each other and connected to each other via a coupling element. If the two-part collision rod preferably extends in a height direction of the treatment device, the long rod segment may collide with a side-view mirror of the vehicle, and the short rod segment may collide with a lower region of the vehicle, such as a front apron, a bumper or a fender. In other words, in an advantageous embodiment of the vehicle treatment system according to the disclosure, the collision body may have a multi-part construction, in particular a two-part construction, wherein the individual collision body segments are advantageously rigidly connected to each other in order to collide with different vehicle components. In this way, a possible collision or a collision risk between the vehicle and the treatment device may be detected for a vehicle that is laterally offset to and diagonally in front of the treatment device with respect to the movement direction of the treatment device.

In an advantageous further development, it may be expedient for the collision body to be held in the starting position via a reset element, which passively, i.e. without sensory and/or actuator properties, transmits a reset force to the collision body. The reset element may preferably press the at least one connection component against at least one stop in order to hold the collision body in the starting position. Preferably, the reset element may exert a tensile/compressive force on the collision body and/or on the at least one connection component in order to hold the collision body in the starting position.

It may be expedient if the reset element is a spring element that exerts a tensile/compressive force on the collision body and/or the connection component in order to hold the collision body in the starting position. Alternatively, the at least one connection component may be designed as the reset element and hold the collision body in the starting position due to its inherent elasticity. That is, if the connection component is the reset element, the connection component may be an elastic component, such as an elastomer, which may deform reversibly when the collision body collides with the vehicle in order to enable the collision body to move relative to the treatment device and to hold the collision body in the starting position during collision-free operation. In addition, it may be expedient for the connection component to have a plurality of rigid segments coupled via elastic elements, preferably springs, in order to hold the collision body in its starting position. The elasticity of the elastic elements exerts a reset force on the collision body and thus holds it in its starting position or presses it into its starting position.

In other words, the reset element may be provided which causes the collision body and thus the at least one connection component to return to the starting position independently/automatically due to a passive force which causes this movement without a signal and without an external energy source. The at least one connecting component, via which the collision body, which is connected to the treatment device with one, two or more degrees of freedom, may be displaced together with the collision body by the vehicle against the movement direction of the treatment device and/or transversely thereto, wherein these two movement directions may be opposed by a holding force/resetting force, which enables the collision body, which is not loaded from the outside or by the vehicle due to a collision, to be held in the starting position by the holding force pressing the at least one connecting component against one, two or more stops. The holding force may be generated by one or two mechanisms, such as a spring force or a pulling force of a mass that is pulled down by the weight force.

Preferably, the collision body may be connected to the treatment device at at least two points. In particular, according to the disclosure, the collision body may be oscillatingly suspended from a cross strut of the treatment device via a suspension and may be supported against a longitudinal strut/door of the treatment device via the at least one connection component. That is, the collision body may be suspended in the region of the cross strut in an oscillating manner at one point and may be supported at a further point on the treatment device via the connection component, so that the collision body may move at least opposite to and/or transversely to the movement direction of the treatment device. That is, the oscillating suspension of the collision body and the support via the connection component can enable the collision body to move by two or more degrees of freedom. Alternatively or additionally, it may also be expedient if the collision body is supported against the treatment device by at least two connection components, preferably arranged one above the other or spaced apart from each other in a height direction of the treatment device. It may also be advantageous if the spaced-apart connection components are realized in a component or in a part with spaced-apart force action points or force application points.

In an embodiment according to the disclosure, the at least one connection component may be an extruded profile rigidly connected to the collision body and has an elongated hole in which a pivot arranged/formed on the treatment device is guided, so that the connection component shifts and rotates relative to the pivot in the event of a collision between the collision body and the vehicle. Preferably, the reset element may press the pivot in the starting position against an end portion of the elongated hole facing away from the collision body. It may also be expedient for the reset element to press the connection component in the starting position with an end portion facing away from the collision body against a twisting stop arranged on the treatment device. Furthermore, it may be advantageous if the reset element is a counterweight or a spring element that holds the connection component in the starting position. Particularly preferably, the connection component may be displaced in the direction of movement relative to the treatment device in the event of a collision between the treatment device and the vehicle until the pivot presses against an end portion of the elongated hole facing the collision body. Furthermore, in the event of a collision between the collision body and the vehicle, the connection component may be rotated transverse to the movement direction relative to the treatment device until the connection component presses against another twisting stop arranged on the treatment device. In order to be able to recognize the collision of the collision body with the vehicle, it may be expedient if a sensor is arranged on the treatment device, which detects a relative movement of a sensor counterpart arranged on the connection component. In this case, the sensor may be configured to detect a relative movement between the connection component and the treatment device in the movement direction and transverse to the movement direction.

According to a further embodiment according to the disclosure, the connection component may be an elastic component which is attached with an end portion to the treatment device and has a receptacle for a sensor assembly coupled to the collision body at its other end portion. Preferably, the sensor assembly may have a cup-shaped sleeve, in which the collision body is held concentrically, in particular by leg springs arranged evenly on an inner circumferential surface of the sleeve, and a sensor attached to an end portion of the sleeve facing away from the collision body, wherein the sensor detects a relative movement between the collision body and the sleeve in order to detect a collision between the collision body and the vehicle. For this purpose, a sensor counterpart may advantageously be axially displaceably mounted on an end portion of the collision body facing the sensor, so that the sensor detects a relative movement of the sensor counterpart.

If the collision body is designed as a two-part collision rod with the long rod element and the short rod element arranged parallel to the axis, the long rod element may preferably be held concentrically in the sleeve and receive the sensor counterpart. The short rod element may also be coupled to the long rod element via a lever mechanism so that the sensor detects a relative movement of the sensor counterpart caused by the short rod element.

In other words, the lower end of the collision rod in the height direction of the vehicle treatment system may be centrally mounted with springs in a cup, which represents the interface between the collision rod and the connecting component, so that a displacement of the collision rod due to a collision with the vehicle causes a movement of the collision rod in the cup against the spring force. This movement may be detected by the sensor, which is located under the end fitting and may therefore detect a displacement in any plane direction, in particular opposite and transverse to the movement direction of the treatment device. The smaller collision rod or the short rod segment may be rigidly connected to the long rod or the long rod segment and provide a connection to the cup with a pivot in such a way that the movements of the collision rod in the above-mentioned, arbitrary, planar directions are not hindered. As a result, a collision of the short rod segment with the vehicle may also lead to a recognizable movement of the end fitting of the long rod segment with the sensor counterpart.

In addition, it may be expedient if the sensor assembly is a cup-shaped sleeve in which the collision body, in particular the long rod element of the collision rod, is held, wherein at least one sensor is arranged between an inner circumferential surface of the sleeve and an outer circumferential surface of the collision body, which detects a contact force between the collision body and the sleeve. When the collision body collides with the vehicle, the collision body moves inside the sleeve and exerts the contact force on the sleeve. The contact force may be detected via the at least one sensor in order to recognize the collision risk between the treatment device and the vehicle.

In an embodiment according to the disclosure, the connection component may be an elastic component, or a component which enables a relative movement between the collision bodies and the treatment device and provides a reset force into the starting position of the collision body, which comprises, at one end portion, a first angle profile, which is relatively movably guided in a second angle profile arranged on the treatment device, and a receptacle for the collision body at another end portion. A sensor may be arranged on the second angle profile, which detects forces of a sensor counterpart (pivot) held in the first angle profile in order to detect a relative movement between the first angle profile and the second angle profile and thus recognize a collision between the collision body and the vehicle. It is conceivable that the first angle profile has an elongated hole in which a holding pivot of the second angle profile is guided, so that the first angle profile can move relative to the first angle profile at least opposite and transversely to the movement direction of the treatment device and this movement is blocked by the sensor that detects this.

In the vehicle treatment system according to the present disclosure, the connection components of the various configurations and embodiments mentioned above may be combined with each other and with any sensor units and/or sensor assemblies. That is, the connection components and sensor assemblies may be iterated with each other in different arrangements.

In other words, the disclosure relates to a vehicle treatment system with a collision detection device comprising an elongate collision body suspended in front of the treatment device to prevent contact between the treatment device and the vehicle. There is a connection between the collision body and the treatment device. If the collision body comes into contact with the vehicle, this has an effect on the connection, which is detected. The distance between the collision body and the vehicle is greater than the braking path required by the treatment device.

BRIEF DESCRIPTION OF THE DRAWINGS

The disclosure is explained in more detail below with reference to preferred embodiments with the aid of Figures. The following is shown.

The Figures are schematic in nature and are provided solely for the purpose of understanding the disclosure. Identical elements are provided with the same reference signs. The features of the various embodiments can be interchanged.

DETAILED DESCRIPTION

Figure 1:
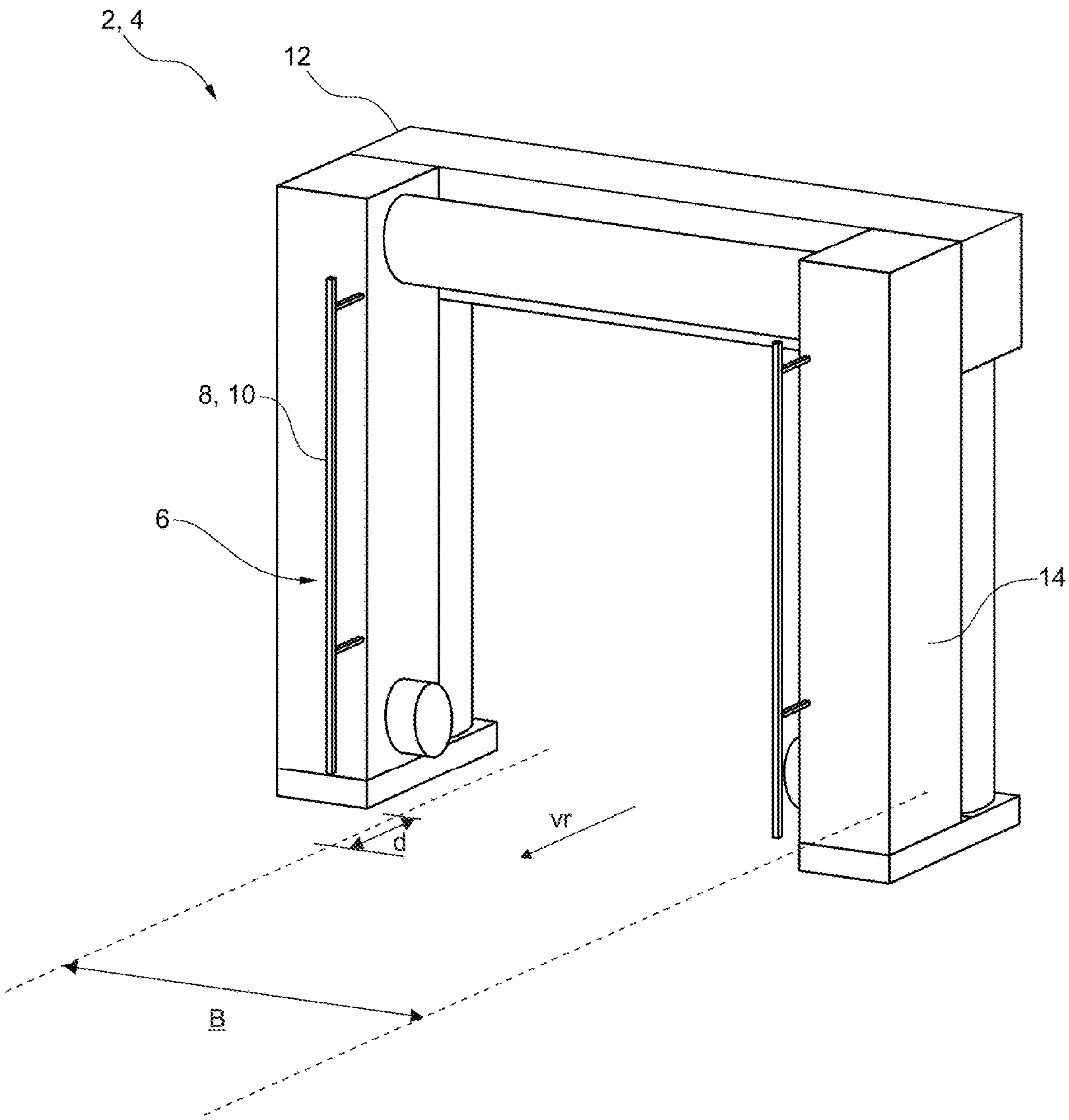
FIG. 1 shows a perspective view of a vehicle treatment system according to the disclosure with a collision detection device.

FIG. 1 is a perspective representation of a vehicle treatment system (gantry washing system) 2 according to a first embodiment of the present disclosure with a treatment device (wash gantry) 4 movable relative to a vehicle to be treated (washed) in a relative movement direction vr. The movement direction vr is defined such that the treatment device 4 moves substantially along the longitudinal direction of the vehicle and sweeps over the vehicle. Such vehicle treatment systems 2 generally have a collision detection device 6 for monitoring the borders of the maximum treatment space B. This collision detection device 6 is intended to prevent a possible collision between the vehicle treatment system 2 and the vehicle to be treated. In the vehicle treatment system 2 of the gantry washing system type shown, the maximum treatment space B, in which no collision with a vehicle parked therein is to be expected, results from a projection of the washing brushes projecting from the inner edges or flanks of the treatment device 4, in particular for cleaning the vehicle wheels, (see FIG. 2) in the relative movement direction vr.

In the preferred embodiment shown in FIG. 1, such a collision detection device 6 is implemented in the form of a tactile width monitoring of the vehicle treatment system 2. This is arranged at an outer border of the treatment space B and monitors in particular the lateral borders of the maximum treatment space B. It therefore ensures that a parked vehicle does not collide with the inner edges or flanks of the gantry columns of the treatment device 4 or treatment equipment, such as brushes and the like, projecting beyond these to the treatment space center.

If the collision detection device 6 recognizes that a portion of a parked vehicle protrudes beyond the lateral borders of the maximum treatment space B and consequently a collision is imminent with further forward movement of the treatment device 4 or the vehicle, it causes the relative movement between the treatment device 4 and the vehicle to stop by stopping the treatment device 4. In other words, the collision detection device 6 recognizes a collision risk between the treatment device 4 and the vehicle by detecting a collision between the collision detection device 6 and the vehicle. When such a collision risk or collision is detected, the relative movement of the treatment device 4 is stopped.

In order to be able to ensure that the treatment device 4 stops in good time before contact/collision with the vehicle, the collision detection device 6 is arranged upstream of the treatment device 4 in the relative movement direction vr. As shown in FIG. 1, the collision detection device 6 is attached to the treatment device 4 in such a way that there is a distance d between the collision detection device 6 and the treatment device 4 in a starting position (zero position) in which no vehicle collides with the collision detection device 6. This means that the collision detection device 6 is positioned in front of the treatment device 4 in the relative movement direction vr by the distance d. In the vehicle treatment system 2 according to the disclosure, the distance d is greater than or equal to a following path, which the treatment device 4 describes after the collision detection device 6 has detected a collision risk between the treatment device 4 and the vehicle.

Figure 2:
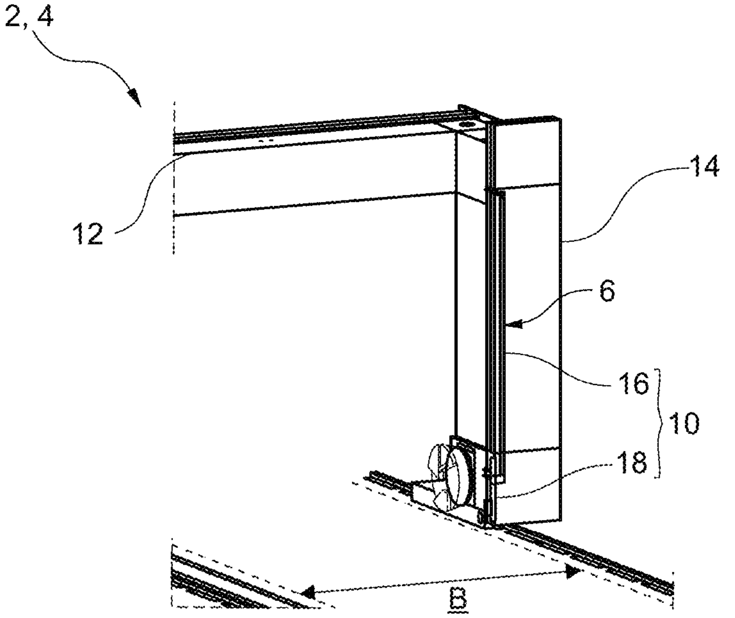
FIG. 2 shows a partial perspective view of a vehicle treatment system with a collision detection device according to a first embodiment.
Figure 3:
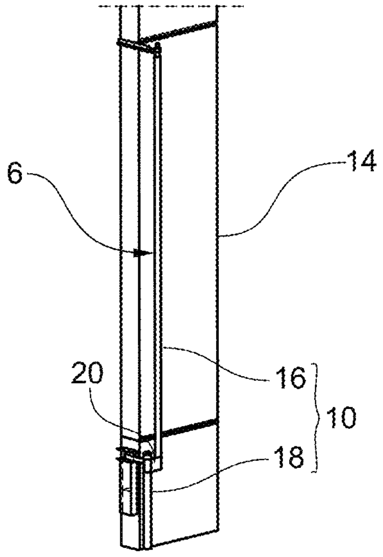
FIG. 3 shows a further partial perspective view of the vehicle treatment system with the collision detection device according to the first embodiment.

FIGS. 2 and 3 show a part of the vehicle treatment system 2 with the collision detection device 6 according to the first embodiment. The collision detection device 6 has a collision body 8, which is designed as a collision rod 10. As can be seen in FIG. 3, the collision rod 10 is oscillatingly attached/suspended to the treatment device 4 in a height direction of the vehicle treatment system 2 or of the treatment device 4 at the top, i.e. in the region of a cross strut 12 of the treatment device 4, and extends downward substantially parallel to a longitudinal strut/door 14 of the treatment device 4.

The collision rod 10 is designed in two parts with a long rod segment 16 and a short rod segment 18. The long rod segment 16 and the short rod segment 18 are arranged axially parallel to each other, spaced apart from each other in the height direction of the vehicle treatment system 2 and rigidly connected to each other via a coupling element 20. As shown in FIG. 3, the long rod segment 16 is arranged above the short rod segment 18 in the height direction of the vehicle treatment system 2. Furthermore, the short rod segment 18 is arranged axially parallel to the long rod segment 16 in such a way that it projects further in a width direction toward the center of the treatment device 4. Thus, the long rod segment 16 can collide with a side-view mirror of the vehicle, whereas the short rod segment 18 can collide with a body part in the floor area of the vehicle, such as a front apron, fender, etc. That is, the collision detection device 6 according to the disclosure makes it possible to detect a collision risk between the treatment device 4 and the vehicle with the short rod element 18 if the vehicle is positioned with lateral offset or at an angle in front of the treatment device 4 with respect to the relative movement direction vr. In addition, the collision detection device with the long rod segment 16 can detect a collision risk between the treatment device 4 and the vehicle if the vehicle is positioned so far to the side relative to the treatment device 4 that this would lead to a collision between the side-view mirror of the vehicle and the treatment device 4. An open door or a transverse position of the vehicle is detected with a combination of the long rod segment 16 and the short rod segment 18.

In the region of the coupling element 20, the collision rod 10 is supported against the door 14 of the treatment device 4 via an extruded profile (connection component) 22. The extruded profile 22 is rigidly connected to the collision rod 10 via the coupling element 20 and has an elongated hole 24, which extends along a direction in which the extruded profile 22 extends.

In other words, the collision rod 10 is attached in front of the treatment device 4 as a collision body 8. The collision rod 10 is suspended from the treatment device 4 in an oscillating manner and supported against the treatment device 4 via the extruded profile 22. The oscillating suspension and support via the extruded profile 22 allows the collision rod 10 to move relative to the treatment device, so that the extruded profile 22 and the collision rod 10 are moved away from the treatment space B or out of the collision area.

Figure 4:
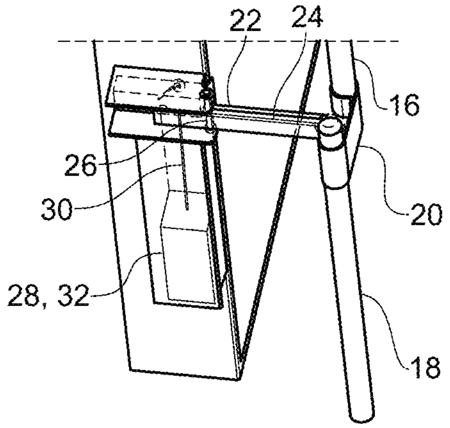
FIG. 4 shows a detailed view of the vehicle treatment system with the collision detection device according to the first embodiment.

As shown in FIG. 4, a pivot 26 is formed on the treatment device 4, which is guided in the elongated hole 24, so that the extruded profile 22 together with the collision rod 10 can move relative to the treatment device 4 against and transversely to the relative movement direction vr. That is, the extruded profile 22 and the collision rod 10 can move and rotate relative to the treatment device 4. If the long rod segment 16 and/or the short rod segment 18 of the collision rod 10 collide with the vehicle, the collision rod 10 and the extruded profile 22 are displaced and/or rotated relative to the treatment device 4.

In FIG. 4, the collision detection device 6 is shown in the starting position mentioned above, in which no collision risk is detected or in which the collision rod 10 is not moved by the vehicle. The collision rod 10 is held in the starting position by a reset element 28. In the collision detection device 6, the reset element 28 is designed as a flexible pulling device 30, which exerts a pulling or compressive force on the extruded profile 22 so that it is held in the starting position. For this purpose, a weight 32 is connected to the extruded profile 22 via a cable pull, so that the weight force of the weight 32 presses the pivot 26 against an end portion of the elongated hole 24 facing away from the collision rod 10. In other words, in the starting position, the extruded profile 22 is pressed forward with the end of the elongated hole 24 against the pivot 26. With an end portion facing away from the collision rod 10, the extruded profile 22 is also pressed against an inner flank (stop) of the treatment device, as shown in FIG. 5, in order to prevent further twisting.

According to the first embodiment, the pulling device 30 is designed such that the pulling force, which holds the extruded profile 22 in the starting position, has two directions of force, which together always pull the extruded profile 22 and thus the collision rod 10 in the direction of the starting position, regardless of which possible position it is in. This is realized by directing the pulling force via the movable weight 32 from a fixed position on the treatment device 4 to a position on the extruded profile 22. Both positions are arranged in such a way that forces always act on the frame that pull the extruded profile 22 into the starting position, to a stop (end portion facing away from the collision rod 10) in the elongated hole 24 and to a stop (inner flank of the treatment device 4) on the treatment device (see force components $F_{R,v}$ and $F_{R,h}$ of the reset force $F_R$ in FIG. 5).

If the collision rod 10 now collides head-on with the vehicle, the collision rod 10 together with the extruded profile 22 moves straight back against the relative movement direction vr until an end portion of the elongated hole 24 facing the collision rod 10 presses against the pivot. If the extruded profile 22 is moved transversely to the relative movement direction vr due to a lateral force component caused by an oblique collision of the collision body 10 with the vehicle, it swivels outward until it finally presses against a twisting stop 34 on the treatment device 4.

Figure 5:
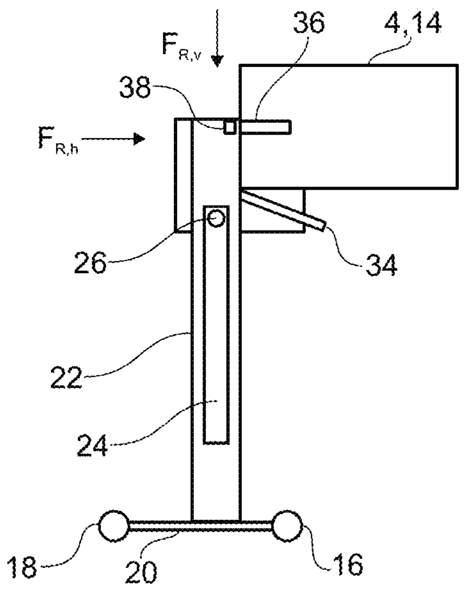
FIG. 5 shows a schematic top view of the collision detection device according to the first embodiment in a starting position.
Figure 6:
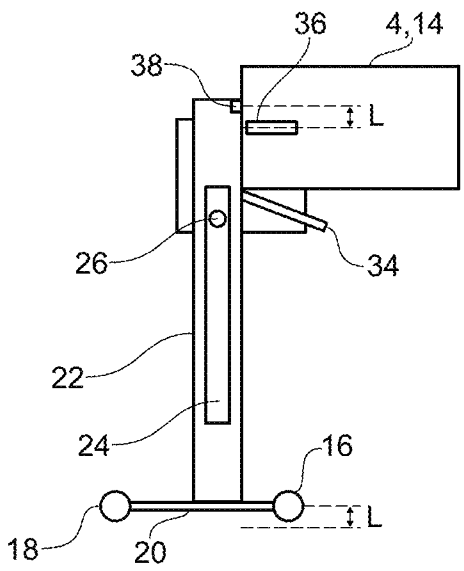
FIG. 6 shows a schematic top view of the collision detection device according to the first embodiment in a deflected position.
Figure 7:
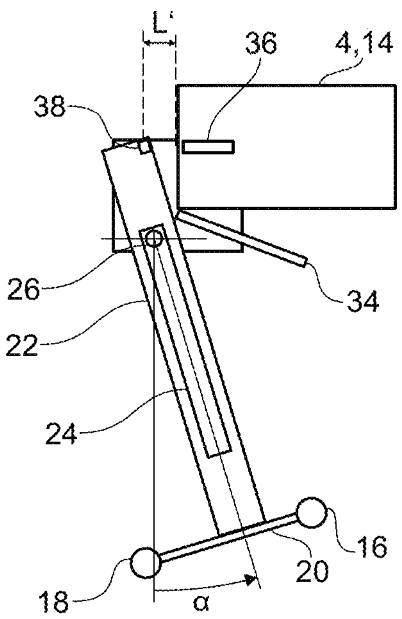
FIG. 7 shows a schematic top view of the collision detection device according to the first embodiment in a further, deflected position

In order to detect a collision/contact of the collision rod 10 with the vehicle, a sensor 36, which can detect a change in distance, is also provided in the collision detection device 6 according to the first embodiment, as shown in FIG. 5. The sensor 36 is rigidly mounted relative to or on the treatment device 4 and recognizes a change in distance to a sensor counterpart 38 that is rigidly mounted on the end portion of the extruded profile 22 facing away from the collision rod 10. A displacement of the extruded profile 22 against the relative movement direction vr along the elongated hole 24 by L, in particular due to a contact of the collision rod 10 with the vehicle, causes a displacement of the sensor counterpart 38 relative to the sensor 36 by L (see FIG. 6). This change in distance L is detected by the sensor 36. Due to a rotation of the extruded profile 22 around the pivot 26 on the treatment device 4 by $\alpha$, in particular as a result of contact of the collision rod 10 with the vehicle, a displacement of the sensor counterpart 38 relative to the sensor 36 by L' occurs, as can be seen in FIG. 7. This change in distance L' is detected by the sensor 36.

If the sensor 36 detects a change in distance L, L', the vehicle treatment system 2 is stopped and the treatment device 4 is stopped. This prevents the vehicle from colliding with the treatment device 4.

In the collision detection device 6 described above according to the first embodiment, the pulling force, which holds the extruded profile 22 and the collision rod 10 in the starting position, is transmitted to the extruded profile 22 as the weight force of the weight 32 via the pulling device 30.

Figure 8:
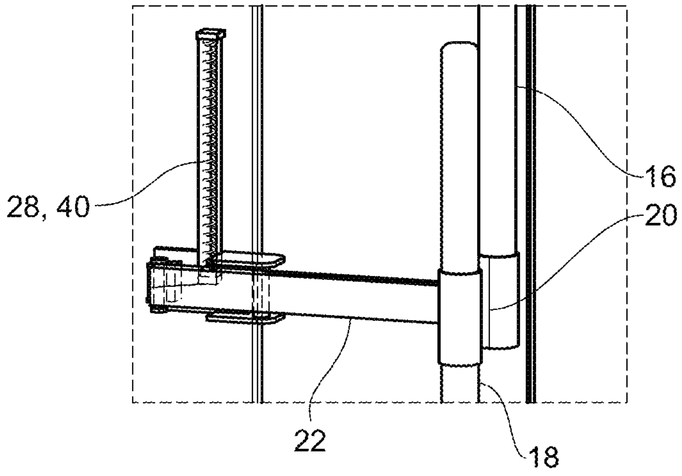
FIG. 8 shows a detailed view of the collision detection device of the vehicle treatment system according to a first modification of the first embodiment.

FIG. 8 shows the collision detection device 6 according to a first modification of the first embodiment. Here, a spring element 40 is provided for applying the pulling force to the extruded profile 22, which pulls the extruded profile 22 into the starting position via a cable pull.

Figure 9:
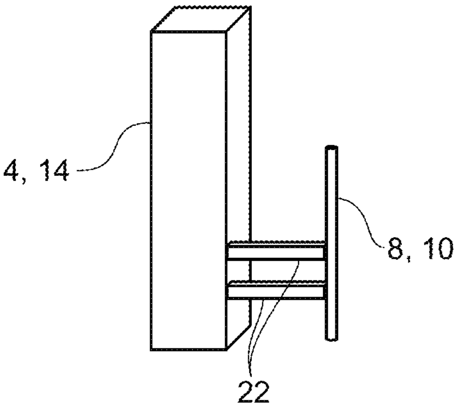
FIG. 9 shows a schematic partial view of the collision detection device of the vehicle treatment system according to a second modification of the first embodiment.
Figure 10:
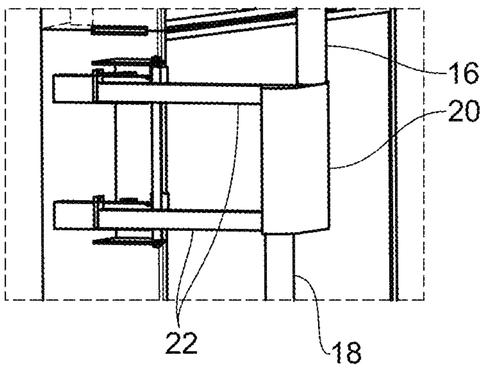
FIG. 10 shows a detailed view of the collision detection device of the vehicle treatment system according to the second modification of the first embodiment.

FIGS. 9 and 10 show the collision detection device 6 according to a second modification of the first embodiment. Here, the collision rod 10 is supported on the treatment device 4 via two extruded profiles 22 spaced apart in the height direction of the vehicle treatment system 2, which is why the oscillating suspension of the collision rod 10 can be omitted. As with the above-mentioned collision detection device 6 according to the first embodiment, the extruded profiles 22 are each guided by the pivot 26, which, as indicated in FIG. 10, extends through the elongated holes 24 of the two extruded profiles 22, so that the collision rod 10 together with the extruded profiles 22 can move and/or rotate relative to the treatment device 4 in the event of a collision with the vehicle.

In other words, the collision body 8 can be connected to the treatment device 4 via one, two or more connection components. The collision body 8 does not have to be held from above via the oscillating suspension. In particular, the collision body 8 is held on the treatment device 4 by several, preferably two, connection components. The connection components allow the collision body 8 to move relative to the treatment device 4. Two of the extruded profiles 22 with elongated hole 24 described above can be used as connection components, which are held in their starting position by a force. The weight force/pulling force of the collision body 8 and of the connection component is applied via a stop, which is attached under one of the two connection components. Due to the elongated hole kinematics of the two connection components, the collision body 8 can be tilted forward and backward and can be rotated around the pivot point of the pivot 26. The two connection components are pulled into the starting position by the pulling forces described above.

Figure 11:
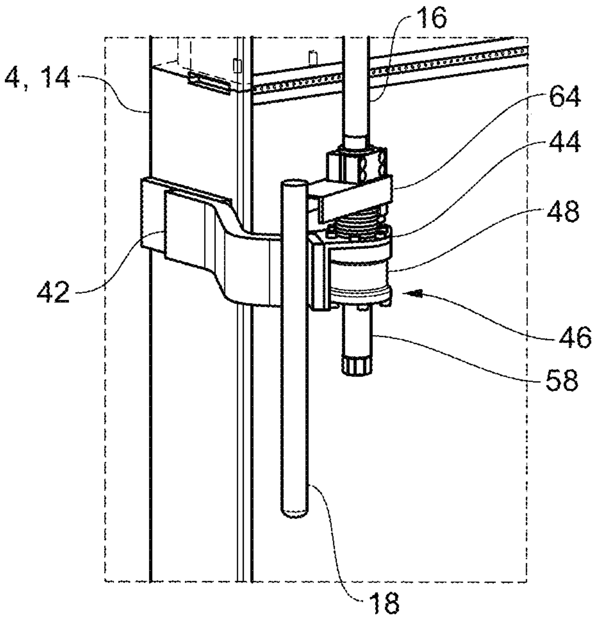
FIG. 11 shows a detailed view of a collision detection device of a vehicle treatment system according to a second embodiment.
Figure 12:
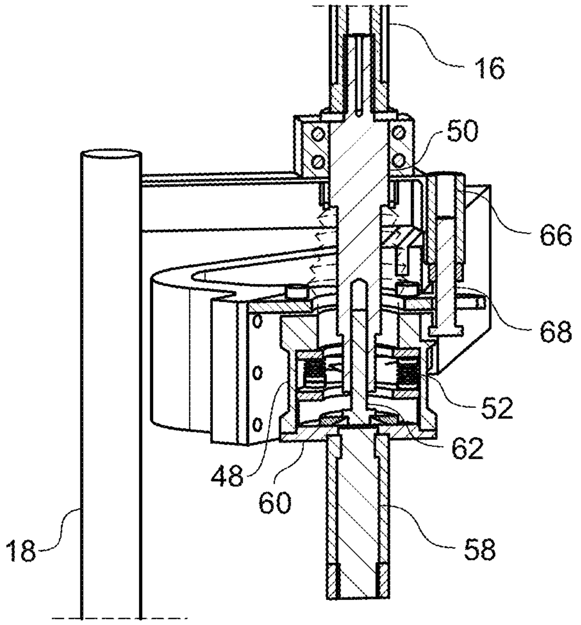
FIG. 12 shows a sectional view of the collision detection device of the vehicle treatment system according to the second embodiment.

In FIGS. 11 and 12, a collision detection device 6 according to a second embodiment is shown. Here, the collision rod 10, i.e. the long rod segment 16 and the short rod segment 18, is supported on the treatment device 4 via a form-flexible fixing element (connection component) 42. In the second embodiment, the fixing element 42 is at least partially made of an elastomer or of elastic or resilient segments and can therefore deform reversibly, i.e. after a deformation, for example as a result of a collision of the collision rod 10 with the vehicle, the fixing element 42 automatically returns to the starting position due to its inherent elasticity. The fixing element 42, which may contain elastomer components or spring elements, thus enables a free following path in several directions.

Figure 14:
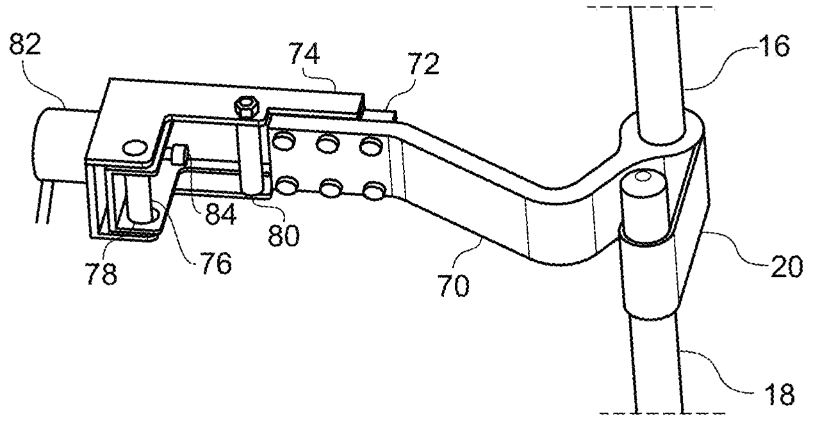
FIG. 14 shows a detailed view of a collision detection device of a vehicle treatment system according to a third embodiment.

As shown in FIG. 11, the fixing element 42 is attached to the treatment device 4 with an end portion facing away from the collision rod 10. A receptacle 44 for a sensor assembly 46 is arranged on the end portion of the fixing element 42 facing the collision rod 10. The sensor assembly 46 has a cup-shaped sleeve 48, which is screwed to the receptacle 44. As can be seen in FIG. 14, a rod end piece 50, which is coupled coaxially with the long rod segment 16 in a fixed position, at least in an axial direction, extends in the height direction of the vehicle treatment system 2 from above into the interior of the sleeve 48. A centering assembly 52 is arranged on an inner circumferential surface of the sleeve 48 and centers the rod end piece 50 and the sleeve 48 relative to each other. That is, the centering assembly 52 enables concentric positioning of the rod end piece 50 and the sleeve 48.

Figure 13:
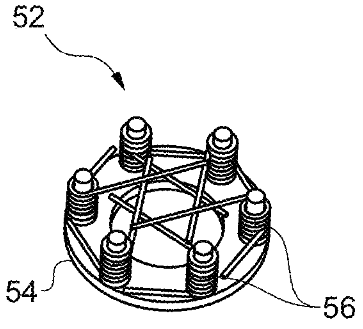
FIG. 13 shows a perspective view of a centering assembly of the collision detection device of the vehicle treatment system according to the second embodiment.

For this purpose, the centering assembly 52, as shown in FIG. 13, has a ring-shaped receptacle disk 54 and a plurality of leg springs 56 evenly distributed around the circumference of the receptacle disk 54. The leg springs 56 are supported against the inner circumferential surface of the sleeve 48 and an outer circumferential surface of the rod end piece 50 in order to keep the sleeve 48 and the rod end piece 50 concentric with each other.

On an end opposite the long rod element 16, a sensor 58 is attached to the sleeve 48 in such a way that it extends downward, preferably vertically, from a bottom plate 60 of the sleeve 48. The sensor 58 is configured to detect an offset of a sensor counterpart 62 opposite to it, in particular in the height direction. The sensor counterpart 62 is axially displaceably received in the rod end piece 50 in order to be able to compensate for longitudinal displacements of the long rod element 16.

If the vehicle now collides with the long rod element 16, the rod end piece 50 presses against the leg springs 56 of the centering assembly 52. I.e. the rod end piece 50 leaves its concentric position in the sleeve 48 and tilts relative to it. The sensor counterpart 62 is thereby moved relative to the sensor 58, wherein the sensor 58 recognizes this movement or this offset as a collision of the long rod element 16 with the vehicle.

In order to also be able to detect a collision between the short rod segment 18 and the vehicle with the sensor assembly 46 of the collision detection device 6 according to the second embodiment, a lever mechanism 64 is arranged on the coupling element 20, which rigidly connects the long rod element 16 and the short rod element 18. As can be seen in FIG. 12, the lever mechanism 64 is diametrically opposite the short rod element 18 with respect to the sleeve 48. In a passage opening 66 of the lever mechanism 64, which extends in the height direction of the vehicle treatment system 2, a punch 68 is accommodated which, in the event of a collision between the short rod segment 18 and the vehicle, can strike against an outer circumferential surface of the sleeve 48 in order to cause a relative tilting between the rod end piece 50 and the sleeve 48 and thus a detectable offset between the sensor 58 and the sensor counterpart 62.

The collision detection device 6 according to the second embodiment thus makes it possible to detect a collision between the collision rod 10 and the vehicle at an interface between the collision rod 10 and the fixing element 42 by detecting a positional shift of the collision rod 10 within the interface. If the collision rod 10 is displaced further during the collision with the vehicle, the collision rod 10 together with the sensor assembly 46 can move outward due to the flexibility of the fixing element 42.

In other words, the lower end of the long rod segment 16 of the collision detection device 6 according to the second embodiment is located centrally in the cup-shaped sleeve (cup) 48, which is attached to the fixing element 42. The sensor 58, which registers the offset of the sensor counterpart 62 opposite it, is located under the rod end piece 50. This sensor counterpart 62 is mounted in a bore of the rod end piece 50 in such a way that longitudinal displacements of the long rod segment 16 are compensated. The rod end piece 50 is contacted by the leg springs 56 around its circumference, which means that it is always centered in the sleeve 48. A displacement of the long rod segment 16 results in the rod end piece 50 being pressed against the leg springs 56 in such a way that it leaves the central position and can touch a stop in the sleeve 48. This movement is detected by the sensor 58. In the event of a collision with the vehicle, the long rod segment 16 is displaced by the vehicle, causing the rod end piece 50 to deform the leg springs 56 until it touches the stop in the sleeve 48. Further displacement of the long rod segment 16 by the vehicle causes the fixing element 42 to allow movement of the collision rod 10 and the sleeve 48. The short rod segment 18 is rigidly connected to the long rod segment 16. The lever mechanism 64 ensures that any contact transferred from the vehicle to the short rod segment 18 leads to a displacement of the rod end piece 50 in the sleeve 48.

Figure 15:
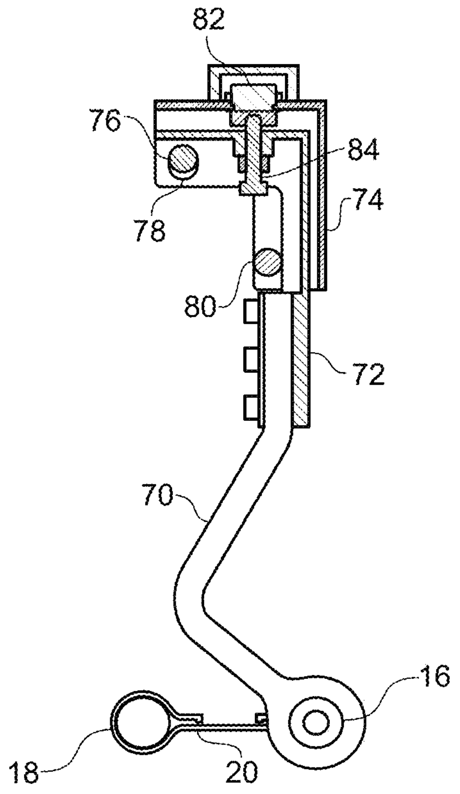
FIG. 15 shows a top view of the collision detection device of the vehicle treatment system according to the third embodiment.

FIGS. 14 and 15 show a collision detection device 6 according to a third embodiment. Here, the collision rod 10 is supported on the treatment device 4 via a support element (connection component) 70. The support element 70 can be made entirely or partially from an elastomer, so that the support element 70 can deform reversibly and thus provide a reset force due to its inherent elasticity, which presses the support element 70 and the collision rod 10 into the starting position.

An end portion of the long rod element 16 arranged in the height direction of the vehicle treatment system 2 is rigidly connected to an end portion of the support element 70. The short rod element 18 is also rigidly connected to the long rod element 16 via the coupling element 20.

In addition, the support element 70 is connected at its end portion facing away from the collision rod 10 to a first L-shaped angle profile 72, which is guided in a second L-shaped angle profile 74 arranged in a fixed position on the treatment device 4. For this purpose, the second angle profile 74 is attached with its long leg to the treatment device 4 and has a pivot 76 in the end region of its short leg, which engages through an elongated hole 78 formed in the end region of the short leg of the first angle profile 72.

If the collision rod 10 comes into contact with the vehicle, the collision rod 10 can move back against the relative movement direction vr due to the elongated hole 78. In order to compensate for the force components of contact with the vehicle transverse to the relative movement direction vr, the first angle profile 72 can rotate relative to the second angle profile 74 about the pivot 76 as a pivot point. This twisting movement is limited on the one hand by the long leg of the second angle profile 74, i.e. by the inner edge of the treatment device 4, and on the other hand by a stop 80 formed in the end region of the long leg of the second angle profile 74. If the collision rod 10 is consequently loaded further transversely to the relative movement direction vr, the flexible support element 70 enables outward movement/retreat in the width direction of the vehicle treatment system 2.

As shown in FIG. 15, a sensor 82, in particular a compressive force movement sensor, is arranged on a region of the short leg of the second angle profile 74 opposite the pivot 76. Opposite the sensor 82, a punch 84 is accommodated in the first angle profile 72. When the collision rod 10 collides with the vehicle, this collision force is transferred to the first angle profile 72. The punch 84 presses against the sensor 82 so that the sensor 82 can detect this collision force and thus also the collision between the collision rod 10 and the vehicle.

Consequently, the collision detection device 6 according to the third embodiment enables detection of a collision between the collision rod 10 and the vehicle at an interface between the treatment device 4 and the support element 70.

The collision detection device 6 according to the third embodiment is designed, as described above, in such a way that a movement of the collision rod 10 leads to a force between the collision rod 10 and the support element 70. The support element 70 is supported on the treatment device 4. The forces acting on the collision rod 10 in two directions of force can be converted via the angle profiles 72, 74 so that they can be detected by the sensor 82, which only measures in one direction of force.

The support element 70 is rigidly connected to the first angle profile 72 so that all forces can be transmitted to it. The pivot 76, the stop 80 and the sensor 82 are rigidly connected to the second angle profile 74, which in turn is fixed to the treatment device 4. The first angle profile 72 is supported on the pivot 76 via the elongated hole 78 and is mounted via the stop 80, against which the first angle profile 72 is supported on the second angle profile 74, in such a way that all collision forces are transmitted to the sensor 82 via the punch 84.

Collision forces on the collision rod 10 transverse to the relative movement direction vr lead to a torque on the first angle profile 72. The counter-torque is generated via a force on the pivot 76 and a force on the sensor 82. This force on the sensor 82 is detected in order to recognize the collision between the collision rod 10 and the vehicle. Collision forces on the collision rod 10 against the relative movement direction vr are transmitted directly to the sensor 82 via the first angle profile 72 and the punch 84 in order to detect the collision between the collision rod 10 and the vehicle.

Figure 16:
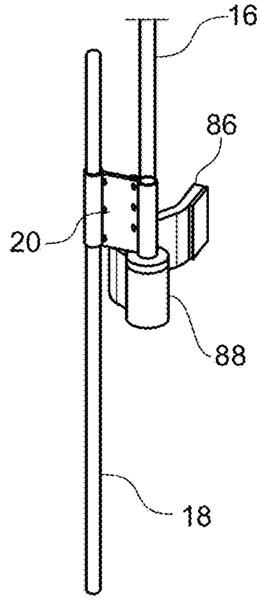
FIG. 16 shows a detailed view of a collision detection device of a vehicle treatment system according to a fourth embodiment.
Figure 17:
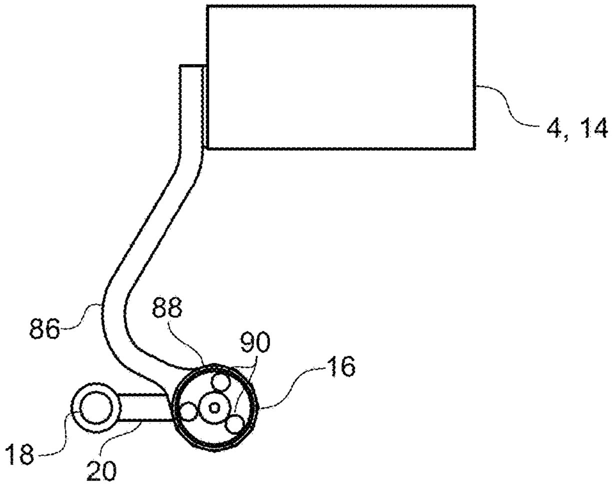
FIG. 17 shows a top view of the collision detection device of the vehicle treatment system according to the fourth embodiment.

FIGS. 16 and 17 show a collision detection device 6 according to a fourth embodiment. The long rod segment 16 and the short rod segment 18 are rigidly connected to each other via the coupling element 20. The collision rod 10 is supported or attached to the treatment device 4 via a support element (connection component) 86. The support element 86 can be made entirely or partially of an elastomer, so that the support element 86 can deform reversibly and thus provide a reset force due to its inherent elasticity, which presses the support element 86 and the collision rod 10 into the starting position.

At an end portion facing away from the treatment device 4, a sleeve-shaped receptacle 88 is formed on the support element 86, into which a lower end portion of the long rod segment 16 engages. As shown in FIG. 17, at least one sensor 90 is arranged between an inner circumferential surface of the receptacle 88 and an outer circumferential surface of the long rod segment 16. The at least one sensor 90 is configured to detect a contact force which acts between the long rod segment 16 and the support element 86 when the collision rod 10 collides with the vehicle. Such sensors 90 may be strain gages or piezoelectric sensors, for example. If several sensors 90 are arranged between the inner circumferential surface of the receptacle 88 and the outer circumferential surface of the long rod segment 16, these are preferably evenly distributed over the circumference of the long rod segment 16.

In the event of a collision between the collision rod 10 and the vehicle, the collision forces are transmitted to the receptacle 88 via the long rod segment 16. The aforementioned at least one sensor 90 is arranged at the interface between the long rod segment 16 and the receptacle 88 in order to be able to detect the transmitted forces and thus recognize a collision between the collision rod 10 and the vehicle.

Accordingly, the collision detection device 6 according to the fourth embodiment enables detection of a collision between the collision rod 10 and the vehicle by detecting a force in the interface between the collision rod 10 and the support element 86 via the corresponding sensor 90.

Figure 18:
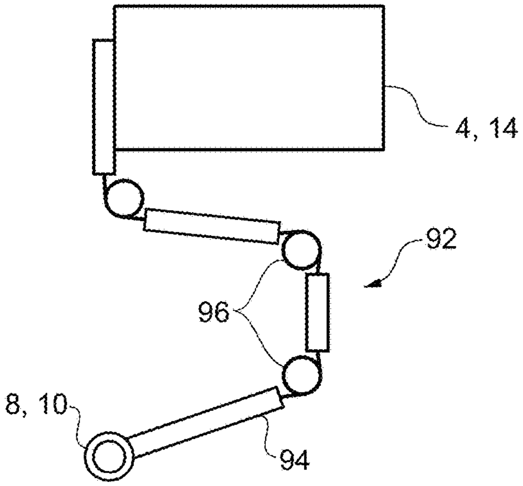
FIG. 18 shows a top view of a collision detection device of a vehicle treatment system according to a fifth embodiment.

FIG. 18 shows a collision detection device 6 according to a fifth embodiment. Here, the collision rod 10 is supported on the door 14 of the treatment device 4 via a spring-rod assembly (connection component) 92. The spring-rod assembly 92 has a plurality of rigid rods 94, bars or plates, each of which is coupled to each other via a spring 96. The spring-rod assembly 92 enables the movement of the collision rod 10 to detect a collision with the vehicle and at the same time provides the reset force due to the spring force of the springs 96 to push the collision rod 10 into the starting position. To detect the movement of the collision rod 10, i.e. to detect a collision of the collision rod 10 with the vehicle, sensors may be provided in the interface between the spring-rod assembly 92 and the door 14 and/or in the interface between the spring-rod assembly 92 and the collision rod 10 in the collision detection device 6 according to the fifth embodiment. In addition or alternatively, a sensor can also be arranged in the region of the springs 96 or rods 94, i.e. within the spring-rod assembly 92.

LIST OF REFERENCE SIGNS

2 vehicle treatment system
4 treatment device
6 collision detection device
8 collision body
10 collision rod
12 cross strut
14 longitudinal strut/door
16 long rod element (first collision-body segment)
18 short rod element (second collision-body segment)
20 coupling element
22 extruded profile (connection component)
24 elongated hole
26 pivot
28 reset element
30 pulling device
32 weight
34 twisting stop
36 sensor
38 sensor counterpart
40 spring element
42 fixing element (connection component)
44 receptacle
46 sensor assembly
48 sleeve
50 rod end piece
52 centering assembly
54 receptacle disk
56 leg spring
58 sensor
60 bottom plate
62 sensor counterpart
64 Lever mechanism
66 passage opening
68 punch
70 support element (connection component)
72 first angle profile
74 second angle profile
76 pivot
78 elongated hole
80 stop
82 sensor
84 punch
86 support element (connection component)
88 receptacle
90 sensor
92 spring-rod assembly (connection component)
94 rod
96 jump
B treatment space
d distance
vr relative movement direction
$F_R$ reset force

The invention claimed is:

1. A vehicle treatment system, in which at least one treatment device and a vehicle to be treated are movable relative to each other in a movement direction within a treatment region, comprising a tactile collision detection device having a collision body supported via at least one connection component on the at least one treatment device and located in a starting position at an outer border of the treatment region of the at least one treatment device, and a sensor unit configured to detect a movement of the collision body relative to the at least one treatment device as a collision risk between the at least one treatment device and the vehicle, the collision body being supported on the at least one treatment device via the at least one connection component such that, in an event of a collision with the vehicle, the collision body is displaced in a direction opposite to and/or in a direction perpendicular to the movement direction of the at least one treatment device until the at least one treatment device stops completely after a collision risk has been detected by the sensor unit.

2. The vehicle treatment system according to claim 1, wherein the sensor unit has at least one sensor which is configured to detect a movement of the collision body and/or of the at least one connection component relative to each other or relative to the at least one treatment device and/or a force transmitted between the collision body and the at least one treatment device.

3. The vehicle treatment system according to claim 2, wherein the at least one sensor is provided at an interface between the at least one connection component and the at least one treatment device and/or at an interface between the at least one connection component and the collision body and/or is accommodated in the at least one connection component.

4. The vehicle treatment system according to claim 1, wherein the collision body is positioned upstream of the at least one treatment device by a distance which is greater than or equal to a braking path which the at least one treatment device requires in order to stop after detection of the collision risk.

5. The vehicle treatment system according to claim 1, wherein the at least one connection component is attached with an end portion to the at least one treatment device and has a receptacle for a sensor assembly coupled to the collision body at its other end portion.

6. The vehicle treatment system according to claim 5, wherein the collision body is held in the receptacle, wherein at least one sensor is arranged between an inner circumferential surface of the receptacle and an outer circumferential surface of the collision body, wherein the at least one sensor detects a contact force between the collision body and the receptacle.

7. The vehicle treatment system according to claim 5, wherein the sensor assembly is a cup-shaped sleeve, in which the collision body is held concentrically and has a sensor attached to an end portion of the cup-shaped sleeve facing away from the collision body, wherein the sensor detects a relative movement between the collision body and the cup-shaped sleeve in order to detect a collision between the collision body and the vehicle.

8. The vehicle treatment system according to claim 7, wherein the collision body comprises a long rod segment received in the cup-shaped sleeve and a short rod segment which are rigidly and eccentrically connected to each other, wherein the short rod segment is coupled to the cup-shaped sleeve via a lever mechanism so that the sensor detects a collision between the long rod segment and the vehicle and a collision between the short rod segment and the vehicle.

9. The vehicle treatment system according to claim 1, wherein the at least one connection component is an extruded profile rigidly connected to the collision body and has an elongated hole in which a pivot arranged on the at least one treatment device is guided, so that the at least one connection component shifts and/or rotates relative to the pivot in the event of a collision between the collision body and the vehicle.

10. The vehicle treatment system according to claim 9, wherein a pulling device is provided which exerts a reset force on the extruded profile in order to hold the collision body in the starting position.

11. The vehicle treatment system according to claim 1, wherein the at least one connection component is an elastic component which provides a reset force to hold the collision body in its starting position.

12. The vehicle treatment system according to claim 1, wherein the at least one connection component comprises a plurality of rigid segments coupled via elastic elements, preferably springs, in order to hold the collision body in its starting position.

13. The vehicle treatment system according to claim 1, wherein the at least one connection component comprises, at one end portion, a first angle profile, which is relatively movably guided in a second angle profile arranged on the at least one treatment device, and at another end portion is connected to the collision body, wherein a sensor is provided, which detects a relative movement of and/or a force between the first angle profile and the second angle profile.

14. A vehicle treatment system, in which at least one treatment device and a vehicle to be treated are movable relative to each other in a movement direction within a treatment region, comprising a tactile collision detection device having a collision body supported via at least one connection component on the at least one treatment device and located in a starting position at an outer border of the treatment region of the at least one treatment device, and a sensor unit configured to detect a movement of the collision body relative to the at least one treatment device as a collision risk between the at least one treatment device and the vehicle, the collision body being supported on the at least one treatment device via the at least one connection component such that, in an event of a collision with the vehicle, the collision body is displaced in a direction opposite to and/or in a direction perpendicular to the movement direction of the at least one treatment device until the at least one treatment device stops completely after a collision risk has been detected by the sensor unit, wherein the tactile collision detection device is positioned upstream of the at least one treatment device by a distance which is greater than or equal to a braking path which the at least one treatment device requires in order to stop after detection of the collision risk.

15. A vehicle treatment system, in which at least one treatment device and a vehicle to be treated are movable relative to each other in a movement direction within a treatment region, comprising a tactile collision detection device having a collision body supported via at least one connection component on the at least one treatment device and located in a starting position at an outer border of the treatment region of the at least one treatment device, and a sensor unit configured to detect a movement of the collision body relative to the at least one treatment device as a collision risk between the at least one treatment device and the vehicle, the collision body being supported on the at least one treatment device via the at least one connection component such that, in an event of a collision with the vehicle, the collision body is displaced in a direction opposite to and/or in a direction perpendicular to the movement direction of the at least one treatment device until the at least one treatment device stops completely after a collision risk has been detected by the sensor unit, wherein the collision body is held in the starting position via a reset element, and a reset force applied to the collision body by the reset element counteracts all possible movement directions of the collision body.

* * * * *